United States Patent Office 3,068,248
Patented Dec. 11, 1962

3,068,248
HALO-DERIVATIVES OF 4-HYDROXY-17α-METHYL-TESTOSTERONE
Bruno Camerino, Roberto Sciaky, and Giovanni Sala, all of Milan, Italy, assignors to Societa Farmaceutici Italia, Milan, Italy, a corporation of Italy
No Drawing. Filed Mar. 23, 1962, Ser. No. 182,115
10 Claims. (Cl. 260—397.4)

This application is a continuation-in-part of our copending patent application Serial No. 79,960, filed January 3, 1961, and relates to halo-derivatives of 4-hydroxy-17α-methyl-testosterone having the formula:

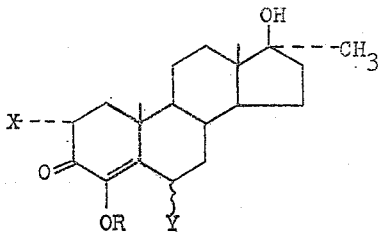

wherein
X=H or α-Br
Y=H, α-Cl, or β-Cl
R=H or Ac where
Ac=acyl group derived from an acid containing not more than 9 carbon atoms, and to processes for preparing them.

B. Camerino et al. have disclosed (in J. Am. Chem. Soc. 78, 1956, page 3540), a number of steroids of the androstane series (having either a chlorine or a hydroxy group in 4-position), which possess outstanding anabolic activity and low androgenic effect. Moreover, all of the products described in the publication are highly active when administered subcutaneously.

More recently, B. Camerino et al. have described (in British patent specification 848,288) 4-hydroxy-17α-methyl-testosterone, which has a high anabolic activity and low androgenic effect even when administered orally. Orally active anabolic substances are especially sought after in the clinic.

The new products of the invention possess oral anabolic activity and are valuable as intermediates for the manufacture of 1,2-dehydro-, 6,7-dehydro- and 1,2:6,7-dehydro-derivatives of 4-hydroxy-17α-methyl-testosterone, which are new oral anabolic substances disclosed and claimed in our above-mentioned copending application.

In particular, our invention provides the following new compounds:

2α-bromo-4-hydroxy-17α-methyl-testosterone,
2α-bromo-4-hydroxy-17α-methyl-testosterone-4-acetate,
6α-chloro-4-hydroxy-17α-methyl-testosterone,
6α-chloro-4-hydroxy-17α-methyl-testosterone-4-acetate,
6β-chloro-4-hydroxy-17α-methyl-testosterone,
6β-chloro-4-hydroxy-17α-methyl-testosterone-4-acetate,
2α-bromo-6α-chloro-4-hydroxy-17α-methyl-testosterone,
2α-bromo-6β-chloro-4-hydroxy-17α-methyl-testosterone,
2α-bromo-6β-chloro-4-hydroxy-17α-methyl-testosterone-4-acetate It is to be understood that other 4-acyloxy products having the aforesaid structural formula are included within the scope of the present invention. The 4-esters can be derived from aliphatic or cycloaliphatic or aromatic acids containing not more than 9 carbon atoms, such as, for example, formate, acetate, propionate, butyr-

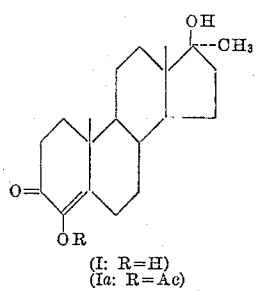

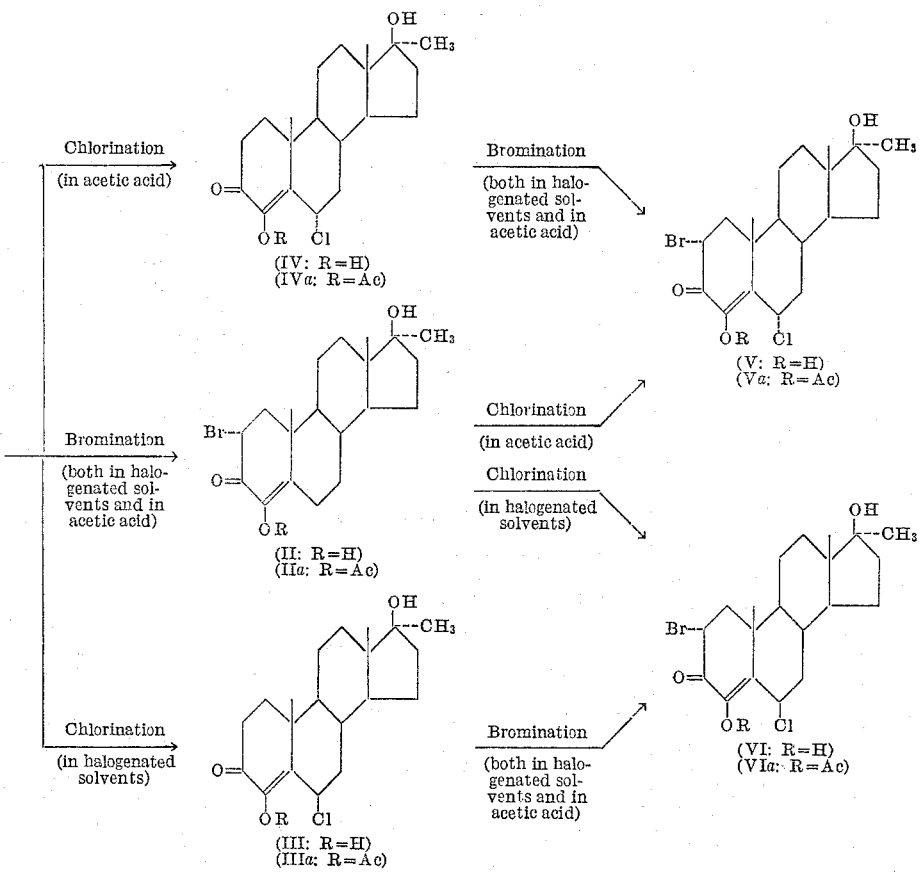

ate, valerate, succinate, heptanoate, cyclopentyl-propionate, cyclohexane acetate, hexahydrobenzoate, benzoate, phenylpropionate and analogues.

The products of our invention are prepared from 4-hydroxy - (or 4 - acyloxy-) 17α-methyl-testosterone described by B. Camerino et al. in the British patent specification 848,288.

The synthesis of the products of the invention is carried out substantially in accordance with the preceding schematic illustration.

In general terms, the process of our invention comprises halogenating 4-hydroxy-(or 4-acyloxy-)17α-methyl-testosterone (I and Ia), either with bromine in the 2-position or with chlorine in 6-position. By dehydrohalogenation of the obtained halo-steroids, products which contain respectively a double bond in the 1,2-position or in the 6,7-position or two double bonds in the 1,2- and 6,7-position may be produced. Esterification of the 4-hydroxy group or hydrolysis of the 4-acyloxy group may be carried out between any steps in the synthesis.

4-hydroxy-(or 4-acyloxy-)17α-methyl-testosterones (I and Ia) may be brominated in the 2-position either with bromine or with N-bromo-succinimide in an organic halogenated solvent such as carbon tetrachloride, chloroform or methylene dichloride or in acetic acid, to produce 2α-bromo-4-hydroxy-(or 4-acyloxy-)17α-methyl-testosterones (II or IIa); or may be chlorinated in the 6-position either with chlorine or with N-chloro-succinimide in an organic halogenated solvent such as carbon tetrachloride, chloroform or methylene dichloride to yield 6β-chloro-4-hydroxy-(or 4-acyloxy-)17α-methyl-testosterones (III or IIIa); or chlorinated with chlorine in acetic acid to yield the 6α-chloro-4-hydroxy-(or 4-acyloxy-)17α-methyl-testosterones (IV or IVa).

By bromination in the 2-position of the 6β-chloro-steroid (III or IIIa) and of 6α-chloro-steroid (IV or IVa) respectively, the 2α-bromo-6β-chloro-steroid (VI or VIa) and the 2α-bromo-6α-chloro-steroid (V or Va) are respectively obtained.

The 2α-bromo-steroid (II or IIa) by chlorination in an organic halogenated solvent such as carbon tetrachloride, chloroform or methylene dichloride gives the 2α-bromo-6β-chloro-steroid (VI or VIa) and by chlorination in acetic acid gives the 2α-bromo-6α-chloro-steroid (V or Va).

We have stated the steric configuration of the 2-bromo- and 6-chloro-derivatives upon following considerations. It is known (L. F. Fieser and M. Fieser, Steroids, Reinhold Publishing Corporation, New York, 1959, page 280), that the bromination of 3-keto-5α-steroids affords the 2α-bromo-derivative having the halogen-atom equatorial. The 2β-bromo-derivative has the halogen-atom axial, involving a remarkable destabilization due to the electrical repulsion between the C—O and C—Br dipoles. Therefore, should such a compound result, it would be so labile that it should escape isolation. Indeed all our attempts to get the 2β-bromo-derivative were unsuccessful.

On the contrary, the chlorination of 4-hydroxy-17α-methyl-testosterone may lead to two different stereoisomers 6-chloro-derivatives, according to the manner in which said chlorination is performed.

In other words, the chlorination of 4-hydroxy-17α-methyl-testosterone carried out with chlorine or with N-chloro-succinimide in an organic halogenated solvent affords a 6-chloro-derivative having melting point 156–159° C., and $$\lambda_{max.}^{ethanol} \text{ at } 282 \text{ m}\mu$$

while the chlorination in acetic acid yields a 6-chloro-derivative having a melting point 189–193° C., $$\lambda_{max.}^{ethanol} \text{ at } 280 \text{ m}\mu$$

It is known (H. J. Ringold et al., Experientia 17, 1961, 65), that among 3-keto-6-chloro-Δ⁴-steroids, the 6β-chloro-derivative shows and U.V. max-absorption at a wavelength higher than the 6α-chloroderivative. We may, therefore, conclude that chlorination of 4-hydroxy-17α-methyl-testosterone in halogenated solvents yields the 6β-isomer, while chlorination in acetic acid yields the 6α-isomer.

The bromination of 6β-chloro-4-hydroxy-17α-methyl-testosterone yields a product melting at 173–182° C. Since the 2-bromo-atom always assumes the 2α-configuration according to the above-mentioned considerations, the product obtained is the 2α-bromo-6β-chloro-4-hydroxy-17α-methyl-testosterone. The bromination of 6α-chloro-4-hydroxy-17α-methyl-testosterone as well as the chlorination in acetic acid of 2α-bromo-4-hydroxy-17α-methyl-testosterone yields a product melting at 175–185° C., which is different from the above-mentioned one, even if by dehydrohalogenation of both isomeric compounds the same product, i.e. 1,2,:6,7-dehydro-4-hydroxy-17α-methyl-testosterone is obtained. In fact, this product is the 2α-bromo-6α-chloro-4-hydroxy-17α-methyl-testosterone.

As it was above already pointed out, the stable equatorial configuration α must be ascribed to the bromo-atom in the 2-position, the two isomeric 2-bromo-6-chloro-derivatives differing only in the configuration of the chloro-atom in the 6-position.

This is confirmed by the comparison of the I.R.-spectra characteristic of the 2 isomers. The 6-chloro-derivative obtained by chlorination in acetic acid of 2α-bromo-4-hydroxy-17α-methyl-testosterone presents, in the I.R.-spectrum, a band at 3570 cm.$^{-1}$ due to the hydroxy-group in the 17β-position; and, besides, a hydroxy group at 3320 cm.$^{-1}$; in this case the hydroxy group forms a strong intramolecular hydrogen-bond (see Bellamy, The Infrared Spectra of Complex Molecules, John Wiley and Sons, Inc., New York, 1958, page 95). On consideration of the steric models, we can easily realize that said hydrogen-bond may be formed only if the chloro-atom in the 6-position has the α-configuration.

The 6-chloro-derivative obtained by chlorination in halogenated solvents of 2α-bromo-4-hydroxy-17α-methyl-testosterone presents, in the I.R.-spectrum, a band at 3570 cm.$^{-1}$ due to the hydroxy in the 17-position and, besides, a hydroxy-group-band at 3480 cm.$^{-1}$. In this case, the hydroxy-group forms an intramolecular hydrogen bond weaker than that of the previous case. On the consideration of the steric models, we can easily realize said hydrogen-bond may be formed when the chloro-atom in the 6-position has the 6β-configuration.

1,2 - dehydro - 4 - hydroxy-(or 4-acyloxy-)17α-methyl-testosterones may be obtained from the 2-bromo-derivatives (II and IIa) by dehydrobromination with lithium bromide and lithium carbonate in dimethylformamide under a nitrogen atmosphere at about 80–110° C. for 10–30 hours.

6,7 - dehydro - 4 - hydroxy-(or 4-acyloxy-)17α-methyl-testosterones are prepared analogously either from the 6β-chloro- or from the 6α-chloro-derivatives (III, IIIa, IV, IVa) by dehydrochlorination with lithium chloride and lithium carbonate in dimethylformamide.

1,2:6,7-dehydro-4-hydroxy-(or 4-acyloxy)-17α-methyl-testosterone may be prepared from the corresponding 2α-bromo-6α-chloro- or 2α-bromo-6β-chloroderivatives (V or Va and VI or VIa) by dehydrohalogenation with lithium chloride, lithium bromide and lithium carbonate in the presence of dimethyl-formamide.

The acylation in the 4-position of the new compounds of the present invention may be carried out with the chloride or the anhydride of an organic acid having not more than 9 carbon atoms optionally in the presence of tertiary amines such as pyridine, between any steps of the synthesis. The hydrolysis of the acyloxy group in the 4-position of the new compounds having the aforesaid general structural formula may be effected between any steps of the synthesis with alkali according to known procedures.

The compounds of the invention show unexpected anabolic activity and are particularly useful when orally administered.

The invention is illustrated, but not limited, by the following preferred embodiments:

Example 1
2α-BROMO-4-HYDROXY-17α-METHYL-TESTOSTERONE (II) FROM (I) PROCESS WITH BROMINE 3 g. of 4-hydroxy-17α-methyl-testosterone (I) are dissolved in 30 cc. of anhydrous chloroform; the solution is cooled to 10° C., and 1.44 g. of bromine, dissolved in 15 cc. of anhydrous chloroform, are added under stirring. A quick absorption of bromine is observed. The chloroform solution is washed with water, 5% aqueous sodium bicarbonate, then with water to neutrality, dried over anhydrous sodium sulphate and evaporated to dryness under vacuum at a temperature under 35° C. The residue is crystallized twice from aqueous methanol.

1.6 g. of (II), melting at 102–104° C. with decomposition, are obtained.

$$\lambda_{max.}^{ethanol} \text{ at } 286 \text{ m}\mu \text{ } (\epsilon=10,750)$$

Example 2
2α - BROMO-4-HYDROXY-17α-METHYL - TESTOSTERONE (II) FROM (I) PROCESS WITH N-BROMOSUCCINIMIDE 1.59 g. of 4-hydroxy-17α-methyl-testosterone (I) are reacted with 0.89 g. of N-bromosuccinimide in boiling 35 cc. CCl₄ for 30 minutes and under direct illumination. The mixture is cooled, filtered, and the filtrate is evaporated to dryness under vacuum at a temperature below 35° C. The residue is crystallized from aqueous methanol. The product melts at 102–105° C., has an absorption maximum at 286 mμ and is identical with the product (II) obtained as described in Example 1.

Example 3
2α - BROMO - 4 - HYDROXY - 17α - METHYL - TESTOSTERONE-4-ACETATE (IIa: Ac=COCH₃) FROM (II)

1 g. of product (II), dissolved in 8 g. of pyridine is acetylated in known manner with 1 g. of acetic anhydride at room temperature. The product (IIa) melting at 80° C. (recrystallized from ether/petroleum ether) is obtained.

$$\lambda_{max.}^{ethanol} \text{ at } 251 \text{ m}\mu \text{ } (\epsilon=14,000)$$

Example 4
1,2-DEHYDRO-4-HYDROXY-17α-METHYL-TESTOSTERONE FROM (II)

To 2 g. of 2α-bromo-4-hydroxy-17α-methyl-testosterone (II), dissolved in 30 cc. of dimethylformamide, 2 g. of lithium bromide and 1.33 g. of lithium carbonate are added under nitrogen with stirring. The mixture is allowed to react at 105° C. for 20 hours. The solution is cooled and poured into 200 cc. of water; the steroid is extracted with ethyl acetate, the extract is washed with water to neutrality, dried over anhydrous sodium sulphate and evaporated to dryness. The residue is crystallized from ether/petroleum ether. After two crystallizations, 0.61 g. of 1,2-dehydro-4-hydroxy-17α-methyl-testosterone melting at 158–161° C. are obtained.

$$\lambda_{max.}^{ethanol} \text{ at } 305 \text{ m}\mu \text{ } (\epsilon=5,100)$$

$$\lambda_{max.}^{ethanol} \text{ at } 244 \text{ m}\mu \text{ } (\epsilon=7,400), [\alpha]_D^{22}=+64\pm2° \text{ } (c.=1\% \text{ in chloroform})$$

Example 5
6β - CHLORO - 4 - HYDROXY - 17α - METHYL - TESTOSTERONE (III) FROM (I) PROCESS WITH CHLORINE IN CHLOROFORM To a solution of 2 g. of 4-hydroxy-17α-methyl-testosterone (I) in 10 cc. of anhydrous chloroform, 0.45 g. of chlorine dissolved in 3.4 cc. of anhydrous chloroform are added. The chloroform solution is washed with water, aqueous 5% sodium bicarbonate and with water to neutrality, dried over anhydrous sodium sulphate and evaporated to dryness under vacuum at a temperature under 35° C. The residue is treated with ether, the product is filtered and crystallized from ether. 0.75 g. of (III) melting at 156–159° C. are obtained.

$$\lambda_{max.}^{ethanol} \text{ at } 282 \text{ m}\mu \text{ } (\epsilon=11,300), [\alpha]_D^{22}=-7\pm2° \text{ } (c.=1\% \text{ in chloroform})$$

Example 6
6β - CHLORO - 4 - HYDROXY - 17α - METHYL - TESTOSTERONE (III) FROM (I) PROCESS WITH N-CHLOROSUCCINIMIDE IN CHLOROFORM 1.59 g. of 4-hydroxy-17α-methyl-testosterone (I) are reacted with 0.67 g. of N-chlorosuccinimide in 35 cc. of boiling chloroform for 30 minutes and under direct illumination. The mixture is cooled, filtered and the filtrate is evaporated to dryness at a temperature below 35° C. The residue is crystallized from ether, the product (III), identical with that yielded as described in Example 5, is obtained.

Example 7
6β - CHLORO - 4 - HYDROXY - 17α - METHYL - TESTOSTERONE-4-ACETATE (IIIa: Ac=COCH₃) FROM (III)

200 mg. of 6β-chloro-4-hydroxy-17α-methyl-testosterone (III) are dissolved in 1 cc. of pyridine and reacted with 0.2 cc. of acetic anhydride at room temperature. After 18 hours, the solution is diluted with water, the steroid is extracted with ethyl acetate, the extract is washed with aqueous 5% hydrochloric acid, water, aqueous 5% sodium bicarbonate and finally with water to neutrality. The extract is dried over anhydrous sodium sulphate and evaporated under vacuum at a temperature below 35° C. The residue is crystallized from ether. The product (IIIa: Ac=COCH₃) melting at 155–158° C. is obtained.

$$\lambda_{max.}^{ethanol} \text{ at } 245 \text{ m}\mu \text{ } (\epsilon=11,700)$$

Example 8
6α - CHLORO - 4 - HYDROXY - 17α - METHYL - TESTOSTERONE (IV) FROM (I) PROCESS WITH CHLORINE IN ACETIC ACID To a stirred solution of 2 g. of 4-hydroxy-17α-methyl-testosterone (I) in 10 cc. of glacial acetic acid, 0.45 g. of chlorine dissolved in 3.5 cc. of chloroform are added by cooling to +5° C.

The solution is washed with water, aqueous 5% sodium bicarbonate and with water to neutrality, dried over anhydrous sodium sulphate and evaporated under vacuum at a temperature not above 35° C. The residue is treated with ether, the product (IV) is filtered and crystallized from ether. Melting point: 189–193° C.

$$\lambda_{max.}^{ethanol}=280.5 \text{ m}\mu$$

By acetylation of (IV) with acetic anhydride in pyridine, the 4-acetate (IVa) melting at 183–186° C. is obtained.

Example 9
6,7-DEHYDRO-4-HYDROXY-17α-METHYL-TESTERONE FROM (IV)

1.1 g. of 6α-chloro-4-hydroxy-17α-methyl-testosterone (IV) dissolved in 26 cc. of dimethylformamide are reacted with 1.70 g. of lithium chloride and 1.20 g. of lithium carbonate under nitrogen with stirring at 105° C. for 20 hours. The solution is cooled and poured into 200 cc. of water. The steroid is extracted with ethyl acetate, the extract is washed with water to neutrality, dried over anhydrous sodium sulphate, decolorized with active carbon and concentrated to small volume. The residual solution is filtered, treated with ether and the product is filtered, washed with ether and crystallized twice from ethyl acetate.

$\lambda_{max.}^{ethanol}$ at 319 m$\mu$ ($\epsilon$=21,500); M.P.=209–211° C.

Example 10

6,7-DEHYDRO-4-HYDROXY-17α-METHYL-TESTOSTERONE FROM (III)

1.1 g. of 6β-chloro-4-hydroxy-17α-methyl-testosterone (III) dissolved in 26 cc. of dimethylformamide are reacted with 1.70 g. of lithium chloride and 1.20 g. of lithium carbonate under nitrogen with stirring at 105° C. for 20 hours. The solution is cooled and poured into 200 cc. of water. The steroid is extracted with ethyl acetate, the extract is washed with water to neutrality, dried over anhydrous sodium sulphate, decolorized with active carbon and concentrated to small volume. The residual solution is filtered, treated with ether and the product is filtered, washed with ether and crystallized twice from ethyl actate. M.P.=209–211° C.

$\lambda_{max.}^{ethanol}$ at 319 m$\mu$ ($\epsilon$=21,500)

Example 11

2α-BROMO-6β-CHLORO-4-HYDROXY-17α-METHYL-TESTOSTERONE (VI) FROM (II)

1.20 g. of 2α-bromo-4-hydroxy-17α-methyl-testosterone (II) dissolved in 7.5 cc. of anhydrous chloroform are reacted with 212 mg. of chlorine dissolved in 2.1 cc. of anhydrous chloroform at 5° C. with stirring. A quick absorption of chlorine is observed. The chloroform solution is washed with water, aqueous 5% sodium bicarbonate and finally with water to neutrality. The extract is dried over anhydrous sodium sulphate and evaporated to dryness under vacuum at a temperature under 35° C. The residue is crystallized twice from ether. The product (VI) melting at 175–182° C. with decomposition is obtained. I.R. absorption bands at 3570 cm.$^{-1}$ and at 3480 cm.$^{-1}$.

Example 12

2α-BROMO-6β-CHLORO-4-HYDROXY-17α-METHYL-TESTOSTERONE (VI) FROM (III)

2.07 g. of 6β-chloro-4-hydroxy-17α-methyl-testosterone (III) dissolved in 15 cc. of anhydrous chloroform are reacted with 0.95 g. of bromine dissolved in 10 cc. of anhydrous chloroform at 5° C. with stirring. A quick absorption of bromine is observed. The chloroformic solution is washed with water, aqueous 5% sodium bicarbonate and finally with water to neutrality. The extract is dried over anhydrous sodium sulphate and evaporated to dryness under vacuum at a temperature under 35° C. The residue is treated with ether; the raw product (VI) melting at 155–165° C. with decomposition is obtained. By crystallization from ether, the M.P. rises up to 173–182° C. with decomposition. I.R. absorption bands at 3570 cm.$^{-1}$ and at 3480 cm.$^{-1}$.

Example 13

2α-BROMO-6α-CHLORO-4-HYDROXY-17α-METHYL-TESTOSTERONE (V) FROM (IV)

By bromination of IV in the same conditions as of Example 12 the 2α-bromo-6α-chloro-4-hydroxy-17α-methyl-testosterone melting at 175–185° C. is obtained. I.R. absorption bands at 3570 cm.$^{-1}$ and at 3320 cm.$^{-1}$.

Example 14

2α-BROMO-6α-CHLORO-4-HYDROXY-17α-METHYL-TESTOSTERONE (V) FROM (II)

By chlorination of II in acetic acid under the same conditions as in Example 8, the 2α-bromo-6α-chloro-4-hydroxy-17α-methyl-testosterone melting at 175–185° C. is obtained. I.R. absorption bands at 3570 cm.$^{-1}$ and at 3320 cm.$^{-1}$.

Example 15

1,2:6,7-DEHYDRO-4-HYDROXY-17α-METHYL-TESTOSTERONE FROM (V) OR FROM (VI)

2 g. of 2α-bromo-6β-chloro-4-hydroxy-17α-methyl-testosterone (VI) or 2α-bromo-6α-chloro-4-hydroxy-17α-methyl-testosterone (V) dissolved in 30 cc. of anhydrous dimethyl-formamide are reacted with 2.25 g. of lithium chloride, 2.25 g. of lithium bromide and 3.2 g. of lithium carbonate at 105° C. for 20 hours in a nitrogen atmosphere and under stirring. The solution is cooled and poured into 200 cc. of water; the steroid is extracted with ethyl acetate and the extract is washed with water, dried over anhydrous sodium sulphate and evaporated to dryness. The residue is crystallized many times from ether, and decolorized with active carbon. The product melting at 180–183° C. is obtained.

$\lambda_{max.}^{ethanol}$ at 232 m$\mu$ ($\epsilon$=11,800)

$\lambda_{max.}^{ethanol}$ at 348 m$\mu$ ($\epsilon$=8,400)

Example 16

2α-BROMO-4-HYDROXY-17α-METHYL-TESTOSTERONE (II) FROM (I) BROMINATION IN ACETIC ACID 0.63 g. of bromine dissolved in 7.15 cc. of anhydrous acetic acid, are added, at 5° C. and under stirring to a solution of 1.25 g. of 4-hydroxy-17α-methyl-testosterone (I) in 7 cc. of anhydrous acetic acid. The solution is poured into 70 cc. of water and the steroid is extracted with ether. The organic extract is washed with water, aqueous 5% sodium bicarbonate, and with water to neutrality, dried over anhydrous sodium sulphate and concentrated to small volume. The product (II), identical with that prepared as described in Examples 1 and 2, is obtained.

Example 17

2α-BROMO-4-HYDROXY-17α-METHYL-TESTOSTERONE (II) FROM (IIa: Ac=COCH₃)

A mixture of 0.5 g. of 2α-bromo-4-hydroxy-17α-methyl-testosterone-4-acetate (IIa: Ac=COCH₃) dissolved in 15 cc. of methanol and 0.5 g. of potassium bicarbonate dissolved in 5 cc. of water, is allowed to react at room temperature for 18 hours. The solution is neutralized with acetic acid, poured into water, and the steroid is extracted with ether. The extract is washed with water to neutrality, dried over anhydrous sodium sulphate and evaporated to dryness at a low temperature. The residue is crystallized from ether. The product (II), identical with that obtained as described in Examples 1, 2, and 19, is obtained.

*Pharmacological activity.*—The anabolic and androgenic activities of a number of products of the present invention are hereinafter reported in comparison with those of 17α-methyl-testosterone and 4-hydroxy-17α-methyl-testosterone. The anabolic (myotropic) and androgenic properties have been determined in male castrated rats weighing 30–40 g., according to the method of Hershberg et al. (Proc. Soc. Exp. Biol. and Med. 83, 1953, page 175). The increase in weight of "levator ani" muscle has been considered as an expression of anabolic activity, while the increase in weight of "prostate" gland has been considered as an expression of androgenic activity. The reported data in the following Table I are referred to wet weights of the organs.

For comparing the anabolic and androgenic activities of the tested steroids the following ratio was established:

$$\frac{\text{Experimental levator ani weight minus control levator ani weight}}{\text{Experimental prostate weight minus control prostate weight}}$$

= therapuetic index (T.I.)

The steroids were administered orally.

TABLE 1.—ANABOLIC AND ANDROGENIC ACTIVITIES (ORAL ADMINISTRATION)

| Steroid | Doses (mg./day) | Levator ani, mg. | Prostate | T.I. |
|---|---|---|---|---|
| Castrated controls | | 8.6 | 9.3 | |
| 17α-methyl-testosterone | 1 | 13.4 | 33.7 | 0.18 |
| Do | 2 | 17.7 | 43.9 | 0.26 |
| Do | 4 | 25.5 | 73.7 | 0.26 |
| 4-hydroxy-17α-methyl-testosterone | 0.5 | 22.6 | 32.4 | 0.61 |
| Do | 1 | 22.8 | 30.7 | 0.66 |
| Do | 2 | 30.7 | 48.1 | 0.57 |
| 2α-bromo-4-hydroxy-17α-methyl testosterone (II) | 0.5 | 19.2 | 22.0 | 0.83 |
| 1,2-dehydro-4-hydroxy-17α-methyl-testosterone | 0.25 | 14.8 | 19.2 | 0.63 |
| Do | 0.5 | 24.7 | 21.3 | 1.24 |
| 6β-chloro-4-hydroxy-17α-methyl-testosterone (III) | 0.25 | 19.5 | 19.9 | 1.02 |
| Do | 0.5 | 21.6 | 24.8 | 0.83 |
| Do | 1 | 25.3 | 34.0 | 0.68 |
| 6β-chloro-4-hydroxy-17α-methyl-testosterone-4-acetate (IIIa: Ac=COCH₃) | 0.5 | 17.6 | 21.8 | 0.72 |
| Do | 1 | 21.9 | 26.4 | 0.77 |

The data of Table 1 show that the new products of the present invention, orally administered, possess a high myotropic activity, much higher than that of 17α-methyl-testosterone, about equal to that of 4-hydroxy-17α-methyl-testosterone, while their androgenic activity is much lower than those of the analogous products.

Therefore, the therapeutic index (T.I.) of the new products of the present invention is decidedly superior to that of 17α-methyl-testosterone and better than that of 4-hydroxy-17α-methyl-testosterone.

The relative anabolic potencies, determined at two dosage levels are reported in Table 2, with respect to our compounds II, III, IV, and IVa.

TABLE 2.—RELATIVE ANABOLIC POTENCIES

| Steroid | Relative anabolic potency |
|---|---|
| 17α-methyl-testosterone | 1 |
| 4-hydroxy-17α-methyl-testosterone | 3 |
| Compound II | 4.6 |
| Compound IV | 5.7 |
| Compound IVa (Ac=COCH₃) | 4 |

We claim:

1. A derivative of 4-hydroxy-17α-methyl-testosterone taken from the group consisting of those having one of the following formulae:

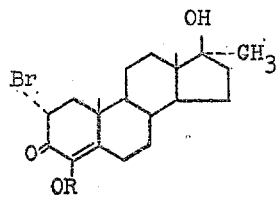

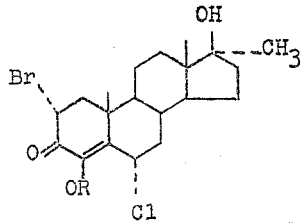

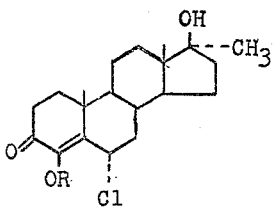

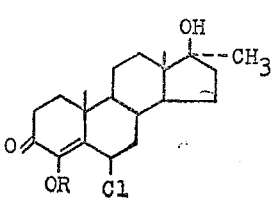

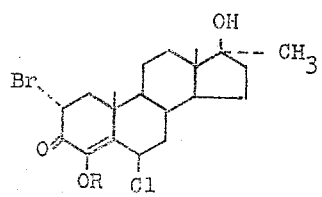

in which R is taken from the group consisting of H and Ac, the Ac radical being an acyl radical of the formula $R_xCO$ in which $R_x$ is a hydrocarbon radical having not more than nine carbon atoms.

2. 2α-bromo-4-hydroxy-17α-methyl-testosterone.

3. 2α-bromo-4-hydroxy - 17α - methyl - testosterone-4-acetate.

4. 6α-chloro-4-hydroxy-17α-methyl-testosterone.

5. 6α-chloro-4-hydroxy - 17α - methyl - testosterone-4-acetate.

6. 6β-chloro-4-hydroxy-17α-methyl-testosterone.

7. 6β-chloro-4-hydroxy - 17α - methyl - testosterone-4-acetate.

8. 2α-bromo-6α-chloro-4-hydroxy - 17α - methyl-testosterone.

9. 2α-bromo-6β-chloro-4-hydroxy - 17α - methyl-testosterone.

10. A process of preparing a compound of the group consisting of 6α-chloro-4-hydroxy-(and 4-acyloxy-)-17α-methyl-testosterone of 6α-chloro-4-hydroxy-(and 4-acyloxy-)-2α-bromo - 17α - methyl - testosterone, comprising chlorinating a compound of the group consisting of 4-hydroxy-(and 4-acyloxy)-17α-methyl-testosterone and of 4-hydroxy-(and 4-acyloxy-)-2α-bromo-17α-methyl-testosterone, the acyl radical being of the formula R—CO in which R is a hydrocarbon radical having up to nine carbon atoms, said chlorinating being carried out by reacting with chlorine in the presence of acetic acid.

References Cited in the file of this patent

FOREIGN PATENTS 814,070   Great Britain _____ May 27, 1959

OTHER REFERENCES

Ringold et al.: J.A.C.S. 81, page 3485 (1959).